US 8,207,846 B2

(12) United States Patent
Van Hoff et al.

(10) Patent No.: US 8,207,846 B2
(45) Date of Patent: Jun. 26, 2012

(54) INPUT/OUTPUT INTERFACE AND FUNCTIONALITY ADJUSTMENT BASED ON ENVIRONMENTAL CONDITIONS

(75) Inventors: Arthur Anthonie Van Hoff, Menlo Park, CA (US); Timothy Bucher, Geyserville, CA (US)

(73) Assignee: Dell Products L.P., Round Rock, TX (US)

( * ) Notice: Subject to any disclaimer, the term of this patent is extended or adjusted under 35 U.S.C. 154(b) by 662 days.

(21) Appl. No.: 12/415,851

(22) Filed: Mar. 31, 2009

(65) Prior Publication Data

US 2009/0267780 A1 Oct. 29, 2009

Related U.S. Application Data

(60) Provisional application No. 61/047,310, filed on Apr. 23, 2008.

(51) Int. Cl.
*G08B 1/08* (2006.01)

(52) U.S. Cl. ............. 340/539.28; 340/601; 340/539.26; 340/815.4

(58) Field of Classification Search ......... 340/601, 340/540, 539.26, 539.28, 3.1, 815.4
See application file for complete search history.

(56) References Cited

U.S. PATENT DOCUMENTS

2009/0160634 A1* 6/2009 Alsop et al. ............... 340/500
2011/0273490 A1* 11/2011 Shimazaki .................. 345/690
2011/0292061 A1* 12/2011 Mineo et al. ................ 345/581

FOREIGN PATENT DOCUMENTS

JP 2006005418 A * 1/2006

\* cited by examiner

*Primary Examiner* — Travis Hunnings
(74) *Attorney, Agent, or Firm* — Workman Nydegger

(57) ABSTRACT

In an electronic device having a graphical output device, a method of controlling input/output characteristics of the output device includes sensing at least one environmental condition, selecting display characteristics of the electronic device based on the environmental condition, and selectively altering size of text displayed on the graphical output device in response to the selected display characteristics.

19 Claims, 2 Drawing Sheets

INPUT/OUTPUT INTERFACE AND FUNCTIONALITY ADJUSTMENT BASED ON ENVIRONMENTAL CONDITIONS

CROSS-REFERENCE TO RELATED APPLICATIONS

This application claims the benefit of U.S. Provisional Patent Application No. 61/047,310 filed Apr. 23, 2008, which application is incorporated herein by reference in its entirety.

BACKGROUND OF THE INVENTION

1. Field of Art

The present invention relates to input input/output on mobile electronic devices. More particularly, embodiments of the invention relate to functionality adjustments based on environmental conditions.

2. The Relevant Technology

Many different types of portable electronic devices are available. And some have been developed to enjoy of the growing availability of digital media. Examples of portable electronic devices include, digital audio devices (such as MP3 players), portable CD players, portable DVD players, notebook computers, cellular telephones, personal digital assistants, and the like.

Portable electronic devices are frequently used in a variety of environments due to the portable nature of such devices. For example, users may use a portable electronic device while in at an office, at home, or on an airplane, while driving or exercising or in any of a variety of situations. Additionally, access to wireless networks such as cellular telephone networks or the Internet also varies. Often, different environments or situations provide different challenges to interacting with the device. Further, users often move between environments, which make portable devices very desirable.

In many cases, these devices include an output such as a graphical display and one or more input device to receive input from a user. The combination of the input and output devices is frequently referred to as an I/O interface. Many electronic devices allow users to change some of the settings associated with the I/O interface, such as the size of displayed text or the brightness of the screen. These settings are often changed by accessing a menu on the display and manually selecting a setting or group of settings to be changed. Such an approach is often time consuming, such that many users do not bother to change the settings.

BRIEF SUMMARY

In an electronic device having a graphical output display, a method of controlling input/output characteristics of the device includes sensing an environmental condition, selecting display characteristics of the electronic device based on the sensed environmental condition, and selectively altering size of text displayed on the graphical output device in response to the selected display characteristics.

In another example, a method of controlling input/output characteristics of a device includes sensing at least one environmental condition, comparing the environmental condition to an environmental parameter to select input and output settings, and selectively implementing the input and output settings if the environmental condition meets the environmental parameter.

An electronic device is also provided that includes a graphical output display for displaying at least media content to a user, an input interface for receiving an input from the user; and at least one sensor for sensing an environmental condition. The device is configured to selectively vary the settings of the graphical output device and the input interface based on sensed environmental data that corresponds to environmental conditions that provide an indication of the external situation.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other aspects of the present disclosure, a more particular description will be rendered by reference to specific embodiments which are illustrated in the appended drawings. It is appreciated that these drawings depict only examples and are therefore not to be considered in scope. Examples will be described and explained with additional specificity and detail through the use of the accompanying drawings in which.

DETAILED DESCRIPTION

The various embodiments of the invention discussed herein relate to electronic devices including electronic devices with grahical displays. The device is configured to sense environmental conditions or factors and then select input/output settings (hereinafter referred to as "I/O settings") based on those sensed environmental conditions. The mobile electronic device may be configured to sense such conditions as temperature, pressure, altitude, location, speed, network availability, power-source type or other similar conditions. These environmental conditions often provide an indication of the environment or situation in which the device is being used. The device analyzes the environmental conditions and selects I/O settings to suit the situation.

I/O settings may include both display settings as well as input settings. Display settings that may be varied or changed include, without limitation, the amount of text displayed on the visual display, the size and/or location of text, brightness, or other display settings. I/O settings may also include other output such as notification settings, which may include ring tone, ring volume, or vibrate settings. Input settings may include, without limitation, the sensitivity of the input devices in receiving input or other settings that may change how input is received based on sensed environmental conditions.

I/O settings that are automatically set depending on environmental conditions may improve the convenience of using the media device by providing output in a readily accessible manner while also receiving information from the user in a manner that is more likely to match the user's actual intent. One example of a general device will first be provided, followed by a description of how such a device may be configured to vary I/O settings based on environmental conditions. The selection of I/O settings will first be discussed with reference to output settings such as display settings. Next the general device will be discussed with reference to altering input settings based on environmental conditions.

In the following detailed description of the embodiments, reference is made to the accompanying drawings which form a part hereof, and in which specific examples are shown by way of illustration. It is to be understood that other examples may be utilized and structural changes may be made without departing from the scope of the present invention.

Figure 1:
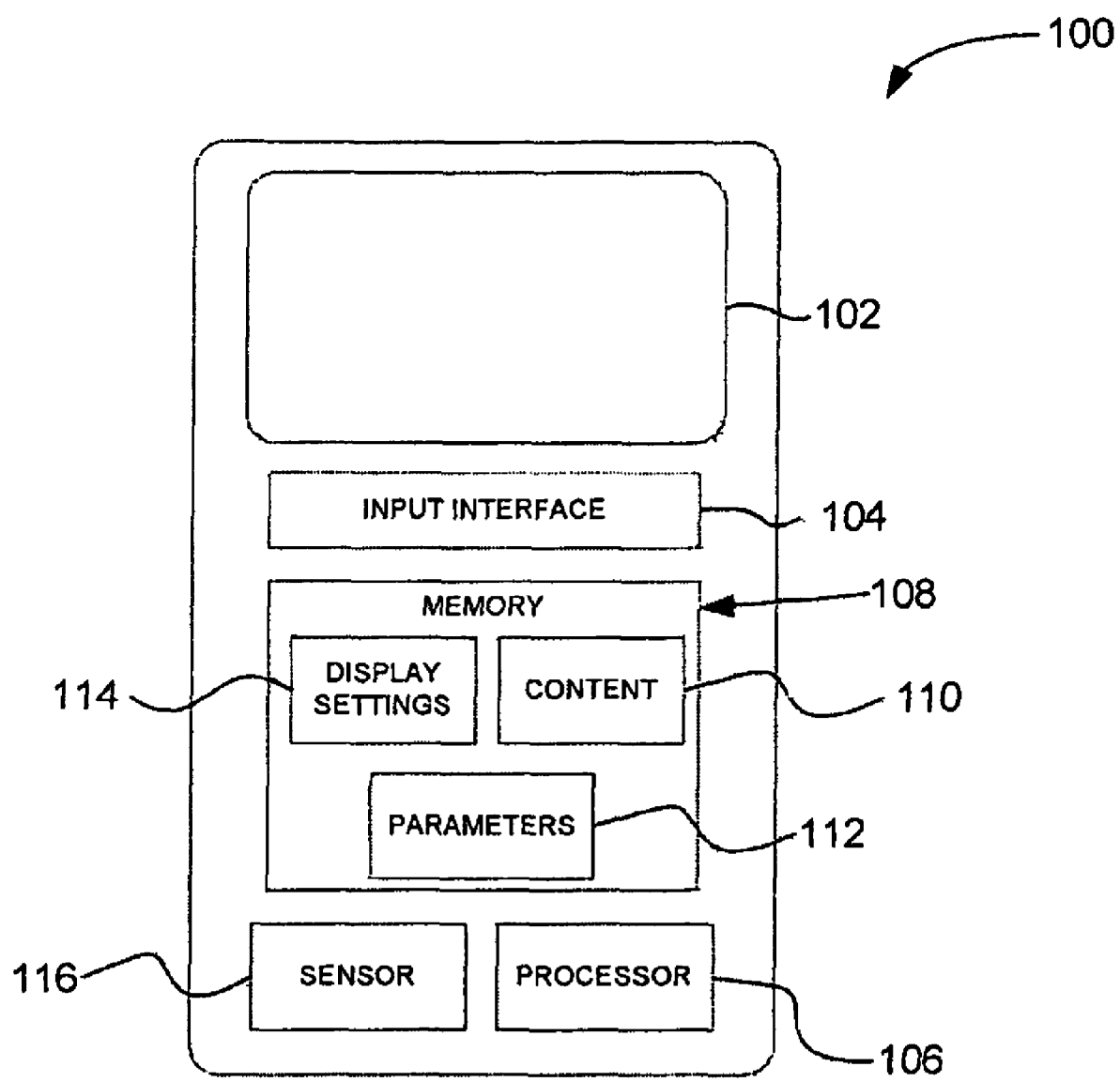
FIG. 1 illustrates a schematic view of a mobile electronic device.

FIG. 1 illustrates embodiment of a device 100 that can receive content including digital media from one or more sources. Examples of the device 100 may include, by way of example and not limitation, a satellite radio device, a portable audio player (such as a MP3 player or iPod), a portable DVD or CD player, a personal computer, a laptop computer, a cellular telephone, a personal digital assistant (PDA), and the like or any combination thereof.

Typically, the device 100 includes a display 102 that can convey information to a user. For example, when the device 100 renders digital audio data, the display 102 may indicate the song title, the artist, the album title, the album art, the track number, the length of the track, other information or any combination thereof. The display 102 may further indicate other behavior of the device and/or provide interaction with an input interface 104. For example, the display 102 may render graphical images and/or text associated with a telephone or network portal, such as an Internet browser, or other functionality.

The device 100 is configured to select the settings of the display 102 based on environmental conditions. By selectively choosing the settings of the display 102 and the input interface 104, the display 102 and the input interface 104 may automatically change to allow the user to more easily interact with the device 100 in a variety of settings depending on such factors as the facility with which a user to focus on the display 102 and the input interface 104. Other factors may influence how I/O settings would be selected such that the device is well-suited for different settings.

The input interface 104 may include any number of means for providing input to the device, such as control buttons, speakers, headphones or other means of providing input to the device 100 or providing additional content to the user. The input interface 104 enables a user to navigate and activate the digital media and other content that is stored on the memory 108 of the device 100 or to navigate and perform any digital media or content that is received from an external source. The input interface 104 may enable a user to switch to another channel, such as in satellite radio, or otherwise select media content.

The content 110 represents different types of media including digital media that may be received by the device 100. Examples of the content 110 include, but are not limited to, digital music, talk audio data, television data, movie data, podcasts, sports data, weather data, news data, Internet data, and the like or any combination thereof. The content 110 can be either digital or analog in nature. The content 110 may further be streamed to the device 100, cached, and/or stored in memory o the device 100.

The memory 108 of the device can be used to store content or other user and/or device data. The memory 108, for example, may store digital music and/or video, graphics, play lists, user preferences, device settings, and the like or any combination thereof. In particular, the memory 108 may be configured to store any number environmental parameters 112 as well as corresponding display settings 114 that may be associated with the environmental parameters 112.

As discussed, the device 100 is configured to select and vary I/O settings based on, for example, environmental conditions. According to one example, the device includes at least one sensor 116 for sensing at least one environment condition. The sensor 116 is coupled to the processor 106. The processor 106 receives and processes signals from the sensor 116 to determine the environmental condition or conditions. The processor 106 then accesses the environmental parameters 112 and corresponding display settings 114 to determine whether a change in the display 102 and/or input settings is appropriate. Several environmental conditions will be discussed below as well as how corresponding I/O settings may be varied based on environmental conditions. The change in I/O settings may include changing display characteristics or other output settings based on environmental conditions.

In addition to selecting device characteristics including display characteristics in response to sensed environmental conditions, the device 100 may be configured to vary how input is received based on sensed environmental conditions. Selectively varying the input based on environment conditions may increase the likelihood that the user's intent will be appropriately communicated to the device in a given situation. Several exemplary scenarios will be discussed in more detail below with respect to display and input characteristics as related to various sensed environmental conditions. The display and input characteristics may also be selected based on the content to be displayed by the device 100. One method of determining I/O settings will now be discussed.

Figure 2:
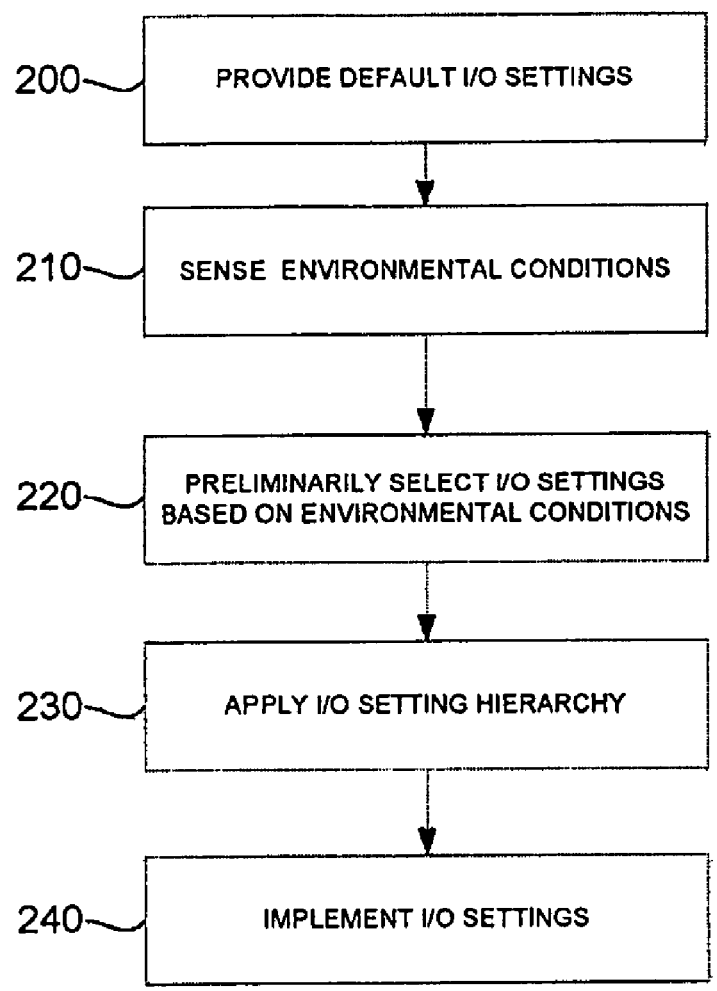
FIG. 2 is a flowchart illustrating a method of controlling input and output settings of a mobile electronic device based on environmental conditions.

FIG. 2 is a flowchart illustrating a method of selecting I/O settings of a mobile electronic device and to a handheld electronic device in particular. The handheld electronic device may include a user interface and a display, such as a graphical output device. The method may begin at 200 by providing default I/O settings. Default I/O settings may include providing default display settings as well as default input settings. For example, it may be desirable to provide default display settings that correspond with preferences frequently selected by users, such as a default display setting that corresponds to a user that is relatively stationary and able to focus on the display. A setting such as this may exist when the user is sitting or standing. Such a setting may exist in an office environment or other environment where the user is able to focus on the display and the input interface. Such a display setting may include providing a display with relatively small fonts, icons, and/or images such that a relatively large amount of data may be displayed on the device.

In such a setting, the input settings associated with receiving input from the user may also be set to a default setting, such that the sensitivity to input devices reflect that the user is able to focus on interacting with the device. The input sensitivity may include the amount of travel a scroll wheel travels to provide a given input, such as increasing playback volume by a given amount. Other examples of input sensitivity include how hard a button is pushed to activate a given response or how long the button must be selected for the input to be received.

While one example of default settings has been described, those of skill in the art will appreciate that any number of default settings may be employed. Further, those of skill in the art will appreciate that the default settings may also be changed as desired. For example, if a given display setting is frequently selected, the device may be configured to adapt the default settings to reflect display setting that is most frequently used.

Embodiments of the invention can begin by providing 200 default I/O settings. Alternatively, embodiments of the invention may begin with existing settings. In either case, the present method also includes sensing 210 environmental conditions. According to one example, environmental data is sensed by receiving environmental data and processing the environmental data to determine environmental conditions. The environmental data may include sensor data from at least one sensor that indicates environmental conditions. For example, data related to several environmental conditions may be sensed that include, without limitation, temperature, pressure, altitude, location, acceleration, speed, availability of a network or networks; and power-source data, among others. Any number of sensors may be used to detect such environmental conditions, including, without limitation, thermometers, barometers, altimeters, global positioning system (GPS) receivers, cellular telephone location-tracking receivers, accelerometers, voltmeters or other voltage or current sensing devices, network cards, or any other sensor or receiver capable of sensing data related to one or more environmental condition. In some embodiments, the environmental conditions can be deduced without a sensor. For example, the presence of a network can be used to determine location.

Once the environmental conditions have been sensed, the environmental conditions are processed to preliminarily determine 220 which I/O settings should be selected. In particular, the method may include comparing the environmental conditions with predetermined parameters. The parameters may be selected according to environmental conditions in which a change in I/O settings may be desirable. If the sensed environmental condition meets one of the predetermined parameters, one or more I/O setting associated with the predetermined parameter is preliminarily selected. The predetermined parameters may represent any number of values such as speed, pressure, temperature, acceleration, changes in these values and/or ranges of such values. Several exemplary predetermined parameters will now be discussed in more detail. For ease of reference, each environmental condition will be discussed relative to the sensed variable, such as a power condition, a speed condition, etc. Similarly, parameters will be discussed relative to the condition to which they relate, such as power parameter, speed parameter, etc.

One environmental condition that may be sensed may be the nature of the power source that is providing power to the device. Power sources may include power from a source internal to the device, such as a battery. Other power sources may include power from a wall adapter or from a car adapter. A comparison of the sensed power condition to a set of power parameters provides an indication of the power source. The sensed power condition may include a detected voltage level while a set of predetermined parameters may include several input voltage ranges. By comparing the detected voltage level to the voltage ranges, the device is able to determine the matching power source parameters. Determining which power source parameters match determines the nature of the power source.

Once the nature of the power source has been determined, the device is then able to select one or more I/O settings based on the nature of the power source. If the power source parameter indicates that the device is docked with a car adapter, the display and/or input settings may be changed for use in an automotive environment. The I/O settings associated with detection of a car adapter may include I/O settings in which the size of displayed text is relatively large and the device has a relatively low sensitivity to input. Similarly, if the comparison indicates the device is receiving power from a wall adapter or other stationary power source, the display settings associated with this power parameter may include settings in which the size of displayed text is relatively small and the device is relatively sensitive to input.

Another environmental condition sensed by the device may include acceleration. One set of acceleration parameters include acceleration values for a relatively rhythmic or periodic acceleration of a relatively small magnitude. If the acceleration condition meets the acceleration parameter, the comparison may provide an indication that the device is being carried by a user that is running or otherwise exercising. The I/O settings associated with such a parameter may include I/O settings in which the size of displayed text is relatively large and the device's has a relatively low sensitivity to input.

Speed parameters may be used to determine various types of movement. Such parameters may include several speed ranges that may be associated with speeds typical in various situations, such as walking, running, riding in a car, flying in an airplane, or other situations. In order to determine the most likely situation corresponding to a sensed speed condition, the method includes comparing the speed condition to the speed parameters. Comparing the speed conditions to the speed parameters determines in which set of ranges, if any, the speed condition falls.

Once the speed parameters in which the speed condition falls have been determined, the eligible display settings associated with the matching speed parameter are preliminarily selected as eligible for implementation. For example, if the matching speed parameter relates to a speed associated with riding in a car, the eligible I/O settings may include I/O settings in which the size of displayed text is relatively large and the device has a relatively low sensitivity to input. Similar settings may also be used if the matching speed parameters relate to speeds associated with walking or running. Speed data may be sensed by any suitable sensor, including, without limitation, a global positioning system (GPS) receiver.

In addition to providing speed data, GPS receivers and other sensors may also receive data that indicates the location of the device. The location of the device may be one of the conditions sensed according to the present method. Locational parameters may be used to select I/O settings. One of such parameters may relate to the location of a users office or other destination. If a comparison between the location condition and the locational parameters indicates the device is within a specified distance of the office, the I/O settings may be selected for use in the office. Selecting I/O settings for use in the office may include setting any notifications, ringers, or alarms to silent or vibrate. Any number of settings may be associated with any number of location parameters as desired.

Pressure is another environmental condition that may be sensed to select I/O settings. Pressure parameters may be provided that include a relatively abrupt change in pressure. Such a change in pressure may provide an indication that the cabin door of an airplane has been closed and the cabin has been pressurized. If a comparison of the pressure condition meets the pressure change associated with the pressure parameter, the I/O settings associated with the pressure parameter may be selected for use on an airplane. These I/O settings may include providing a notification to the user indicating that the device will disconnect from available networks. The device may then disconnect from available networks, such as after the notification has been displayed for a predetermined period of time. Alternatively, the device may disconnect from available networks without displaying a notification.

The availability of networks may also provide an indication of environmental conditions. If the network availability condition meets the network availability parameters, settings associated with the network parameters will be selected. Certain networks may be available at certain locations. For example, an office network is available at or near the office. As such, a network availability parameter may include the availability of such a network. If the network availability condition meets the network availability parameters, appropriate I/O settings may be selected, such as I/O settings used in the office, as previously discussed. Other I/O settings may be used with other network availability parameters.

In some embodiments, an I/O setting hierarchy may be applied 230 to select which of the I/O settings meet the corresponding parameters and may thus be used in changing the I/O settings. If several settings are eligible, it may be desirable for a certain display setting to be implemented over other, also-qualifying I/O settings. For example, if the sensed environmental data falls within a predetermined parameter associated with device movement at a relatively low speed, one qualifying I/O setting may be a default setting in which the fonts are relatively small and the device relatively sensitive to input.

If, however, the environmental data also falls within a predetermined parameter that a repetitive acceleration is taking place, another setting may also qualify in which the text is displayed in a simplified and magnified manner and the device is relatively less sensitive to input. One such situation may occur if the user is jumping rope while using the device or running on a treadmill. In any case, when repetitive accelerations are sensed for a predetermined period of time, such as a few seconds, it may be desirable for the device to select I/O settings in which the text displayed is relatively large and/or the device is less sensitive to input. Other hierarchies may be established such that one I/O setting or group of settings is used over other, also-qualifying settings. Once the display and/or input settings have been selected, the device then implements 240 the settings. In one example, the processor implements the I/O settings to cause the display or other output devices to change output as necessary as well as changing corresponding input settings to receive input.

Embodiments herein may comprise a special purpose or general-purpose computer including various computer hardware. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an electronic device having a graphical output device, a method of controlling input/output characteristics of the output device, comprising:
    sensing at least one environmental condition;
    selecting display characteristics of the electronic device based on the at least one environmental condition; and
    selectively altering sizes of text displayed on the graphical output device in response to the selected display characteristics,
    wherein the sensing at least one environmental condition includes sensing at least one of temperature, pressure, altitude, location, acceleration, speed, availability of a network, or power-source data.

2. The method of claim 1, further comprising selectively altering input settings based on the at least one environmental condition.

3. The method of claim 2, wherein altering input settings based on the at least one environmental condition includes selectively altering sensitivity to input received by an input interface.

4. In an electronic device, a method of controlling input/output characteristics, the method comprising:
    sensing at least one environmental condition, wherein the sensing at least one environmental condition includes sensing at least one of a temperature condition, pressure condition, altitude condition, location condition, acceleration condition, speed condition, availability of a network condition, or power-source data condition;
    comparing the at least one environmental condition to at least one environmental parameter to select input and output settings; and
    selectively implementing the input and output settings when the at least one environmental condition meets the at least one environmental parameter.

5. The method of claim 4, further comprising applying an input/output setting hierarchy prior to the step of selectively implementing the input and output settings.

6. The method of claim 4, wherein sensing at least one environmental condition includes sensing a pressure condition, wherein comparing the at least one environmental condition to at least one environmental parameter includes comparing the pressure condition to a pressure parameter, and wherein selectively implementing input and output settings if the pressure condition meets the pressure parameter includes disconnecting the device from connected networks.

7. The method of claim 4, wherein sensing at least one environmental condition includes sensing a speed condition, wherein comparing the at least one environmental condition to at least one environmental parameter includes comparing the speed condition to a speed parameter, and wherein selectively implementing input and output settings if the speed condition meets the speed parameter includes altering a size of displayed text relative to a default text setting.

8. The method of claim 7, wherein selectively implementing input and output settings if the speed condition meets the speed parameter includes altering a sensitivity of the device to input relative to a default sensitivity setting.

9. The method of claim 8, wherein sensing at least one environmental condition includes sensing a speed condition, wherein comparing the at least one environmental condition to at least one environmental parameter includes comparing the speed condition to a speed parameter, and wherein selectively implementing input and output settings if the speed meets the speed includes enlarging text relative to a default text setting.

10. The method of claim 9, wherein selectively implementing input and output settings if the speed condition meets the speed parameter includes reducing the sensitivity of the device to input relative to default a default sensitivity setting.

11. The method of claim 4, wherein sensing at least one environmental condition includes sensing a network availability condition, wherein comparing the at least one environmental condition to at least one environmental parameter includes comparing the network availability condition to a network availability parameter, the network availability parameter having a group of input and output setting associated therewith, and wherein selectively implementing input and output settings if the network availability condition meets the network availability parameter includes implementing the input and output settings associated with the network availability parameter.

12. The method of claim 4, wherein sensing at least one environmental condition includes sensing a power source condition, wherein comparing the at least one environmental condition to at least one environmental parameter includes comparing the power source condition to a power source parameter, and wherein selectively implementing input and output settings if the power condition meets the power parameter includes enlarging text relative to a default text setting.

13. The method of claim 4, wherein sensing at least one environmental condition includes sensing a network availability condition, wherein comparing the at least one environmental condition to at least one environmental parameter includes comparing the network availability condition to a network availability parameter, the network availability parameter having a group of input and output setting associated with each available network, and wherein selectively implementing input and output settings if the network availability condition meets the network availability parameter includes implementing the input and output settings associated with the available network.

14. The method of claim 4, wherein sensing at least one environmental condition includes sensing a location condition, wherein comparing the at least one environmental condition to at least one environmental parameter includes comparing the location condition to a locational parameter, the locational parameter having a group of input and output setting associated at least one location, and wherein selectively implementing input and output settings if the location condition meets the locational parameter includes implementing the input and output settings associated with the location.

15. An electronic device, comprising:
a graphical output display for displaying media content to a user;
an input interface for receiving an input from the user; and
at least one sensor for sensing an environmental condition that provides an indication of an external situation, wherein the device is configured to selectively vary settings of the graphical output display and of the input interface based on sensed environmental data that corresponds to the environmental condition, wherein sensing the at least one environmental condition includes sensing at least one of a temperature condition, pressure condition, altitude condition, location condition, acceleration condition, speed condition, availability of a network condition, or power-source data condition.

16. The device of claim 15, wherein the device is configured to disconnect from available networks when the sensed environmental data corresponds to environmental conditions present when the device is in use on an airplane.

17. The device of claim 15, wherein the device is configured to vary the size of displayed text on the graphical output device and reduce sensitivity of input received from the input interface when sensed environmental data corresponds to environmental conditions present when the device is in use in a moving automobile.

18. The device of claim 15, wherein the device is configured to alter the size displayed text on the graphical output device and vary sensitivity of input received from the input interface when sensed environmental data corresponds to environmental conditions present when the device is being used in an exercise environment.

19. The device of claim 15, wherein the device is configured to implement input and output settings associated with a set location when the environmental data indicates the device is within a predetermined distance of the set location.

\* \* \* \* \*